(12) United States Patent
Cook

(10) Patent No.: US 9,014,692 B2
(45) Date of Patent: Apr. 21, 2015

(54) DIGITAL ENHANCED CORDLESS TELECOMMUNICATIONS (DECT) METHOD AND SYSTEM FOR DIGITAL TELEPHONY SELF INSTALL

(75) Inventor: Michael J. Cook, Flemington, NJ (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 1652 days.

(21) Appl. No.: 12/204,897

(22) Filed: Sep. 5, 2008

(65) Prior Publication Data

US 2010/0062766 A1   Mar. 11, 2010

(51) Int. Cl.
*H04W 4/00* (2009.01)
*H04M 1/00* (2006.01)
*H04M 1/66* (2006.01)
*H04M 1/725* (2006.01)
*H04L 12/24* (2006.01)

(52) U.S. Cl.
CPC ........ *H04M 1/72502* (2013.01); *H04L 41/5054* (2013.01); *H04L 41/5087* (2013.01); *H04M 2250/08* (2013.01)

(58) Field of Classification Search
CPC .............................. H04W 8/265; H04W 4/001
USPC ........................ 455/426.1, 426.2, 465, 554.2; 379/201.12
See application file for complete search history.

(56) References Cited

U.S. PATENT DOCUMENTS

| | | | |
|---|---|---|---|
| 2001/0053194 A1 | 12/2001 | Johnson | |
| 2003/0176197 A1 | 9/2003 | Chen et al. | |
| 2005/0198218 A1* | 9/2005 | Tasker et al. | 709/220 |
| 2008/0167027 A1* | 7/2008 | Gautier et al. | 455/419 |
| 2010/0008264 A1* | 1/2010 | Ellis et al. | 370/259 |

OTHER PUBLICATIONS

Canadian Office Action for Application No. 2,678,300 mailed Feb. 3, 2012, pp. 1-2.

* cited by examiner

*Primary Examiner* — Omoniyi Obayanju
(74) *Attorney, Agent, or Firm* — Banner & Witcoff, Ltd.

(57) ABSTRACT

A self-install model for installing digital telephony services at a user premises uses a Digital Enhanced Cordless Telecommunication ("DECT") system having a base station and a cordless telephone. The self-install model enables the activation of telephony services at the user premises automatically through an Internet Protocol network of a service provider such that the user is able to make and receive calls at the user premises over a communication network upon activation of the telephony services. The self-install model involves pre-tests to ensure signal strength of the connection between the user premises and the communication network; acceptance by the user to the service provider's terms and conditions for providing the telephony services to the user premises by way of messages from the service provider being displayed on the cordless handset; activation of the telephony services by the service provider; and post-install service verification tests.

15 Claims, 3 Drawing Sheets

DIGITAL ENHANCED CORDLESS TELECOMMUNICATIONS (DECT) METHOD AND SYSTEM FOR DIGITAL TELEPHONY SELF INSTALL

BACKGROUND OF THE INVENTION

1. Field of the Invention

The present invention relates to Digital Enhanced Cordless Telecommunication ("DECT") systems and to activating telephony services.

2. Background Art

Typical telephone systems involve a cumbersome manual process for a telecommunication service provider to provide telephony services to a user (i.e., a customer) premises such that the user is able to make and receive calls over a communication network. For example, such a manual process includes the user contacting the service provider via a phone, a portal, a retailer, etc., to request telephony services. An installation professional then physically arrives at the user premises and performs the necessary steps for provisioning the telephony services. Additionally, the user has to accept the service provider's terms and conditions for providing the telephony services by signing documents and/or providing concurrence on-line.

Drawbacks associated with this process include the following. The end-to-end time for installation and service activation is long (on the order of days or weeks). A possibility of error exists due to involvement of manual steps such that additional visits by the installer may be needed. Professional manual installation has high operational costs and depends on the availability of both the user and the installer. A back-log of installation requests to accommodate many users is often created resulting in delay in providing telephony services to the users.

A process for a service provider to provide telephony services to a user premises which alleviates drawbacks associated with using an installation professional includes the following. The user contacts the service provider to request the telephony services. In turn, the service provider dispatches a self-install kit having a modem to the user in place of the installation professional visiting the user premises. The user plugs the modem into the communication network at the user premises. The user then notes requisite information of the modem such as its media access control ("MAC") address and provides this information to the service provider. A support team of the service provider uses this information to perform the provisioning steps to activate the telephony services at the user premises.

Drawbacks associated with this process include the following. The steps involved in the installation of the self-install kit require that the user have sufficient knowledge of the modem and instructions for its installation. The process of the user observing and conveying the MAC address, which is a twelve digit alpha numeric ID, along with other requisite information to the service provider can be difficult and error prone. Lack of this knowledge stalls the installation process and requires support from an installation professional which induces delay. The activation process requires live support from the support team.

Upon telephony services being activated at the user premises, the user is able to make and receive calls over the communication network using a telephone connected to the modem. The telephone may include a base station and a cordless handset. The base station is connected with the modem for the user to make and receive calls via the communication network. The cordless telephone can be moved around and away from the base station within a given area and receive and send data to the base station which is representative of incoming and outgoing calls respectively. Such telephones which include a base station and a cordless handset may be part of a Digital Enhanced Cordless Telecommunication ("DECT") system.

SUMMARY OF THE INVENTION

It is an object of the present invention to provide a method and a system for installing digital telephony services at a user premises using a Digital Enhanced Cordless Telecommunication ("DECT") system.

It is another object of the present invention to provide a method and a system for automating the end-to-end process of installing digital telephony services at a user premises with the ease of provisioning, immediate activation, and reliability through self-service by using a DECT based cordless telephone.

It is a further object of the present invention to provide a digital telephony self install model using a DECT based cordless telephone.

In carrying out the above objects and other objects, the present invention provides a method for activating telephony service at a user premises having a DECT device including a base station and a cordless handset and having a modem connect to the base station and to a communication network. The method includes receiving by an application server from the cordless handset, a request of a user for telephony service to be activated at the user premises. The method further includes sending by the application server to the cordless handset, a message indicative of a condition for the user to accept for the telephony service to be activated. The method further includes receiving by the application server from the cordless handset, a response of the user accepting the condition for the telephony service to be activated. The method further includes receiving by the application server from the base station, information regarding the modem including the address of the modem. The method further includes obtaining by the application server from a database, a telephone number to be assigned to the user premises based on the address of the modem. The method further includes sending by the application server to a provisioning system, a service activation request for the provisioning system to activate the telephony service. The service activation request includes the assigned telephone number and the address of the modem. The method further includes performing by the provisioning system, an activation process to activate the telephony service based on the service activation request.

Also, in carrying out the above objects and other objects, the present invention provides a system for activating telephony service at a user premises. The system includes a DECT device including a base station and a cordless handset at a user premises. The system further includes a modem at the user premises. The modem is connected to the base station and a communication network. The system further includes a service provider network having an application server and a provisioning system. The activation server is connected to the communication network to: receive from the cordless handset a request of a user for telephony service to be activated; send to the cordless handset a message indicative of a condition for the user to accept for the telephony service to be activated; receive from the cordless handset a response of the user accepting the condition for the telephony service to be activated; and receive from the base station via the communication network the address of the modem. The application server obtains a telephone number to be assigned to the user premises based on the address of the modem and then sends to the provisioning system a service activation request including the assigned telephone number and the address of the modem for the provisioning system to activate the telephony service at the user premises. The provisioning system activates the telephony service based on the service activation request.

An embodiment of the present invention provides a self-install model for installing digital telephony services at a user premises using a DECT system having a base station and a cordless telephone. The self-install model enables the activation of telephony services at the user premises automatically through the Internet Protocol ("IP") network of a telecommunication service provider (which services include telephone, video, and high-speed data services) such that user is able to make and receive calls over the communication network of the service provider upon activation of the telephony services. The communication network may use coaxial cable, fiber optic cable, or a hybrid fiber optic coaxial cable (HFC). The communication network may be a wireless network or include a wireless component.

The self-install model includes four phases. The first phase involves pre-tests to ensure signal strength of the connection between the user premises and the communication network. The second phase involves acceptance by the user to the service provider's terms and conditions for providing the telephony services to the user premises. The third phase involves the service provider activating the telephony services at the user premises. The fourth phase involves post-install service verification tests (e.g., test calls).

During the self-install process, messages are displayed on a display unit of the cordless handset to walk the user through the self-install process. The messages are provided from the IP network of the service provider over the communication network to the cordless handset. The user responds to each message by selecting appropriate keys of the cordless telephone. The cordless handset provides the user's responses over the communication network to the IP network of the service provider.

An advantage associated with the self-install model includes the ease of provisioning and immediate activation of telephony services resulting in a plug-and-play experience for users. Another advantage associated with the self-install model includes the ability for users to upgrade to additional telephony services over time after the basic telephony service is installed.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Figure 1:
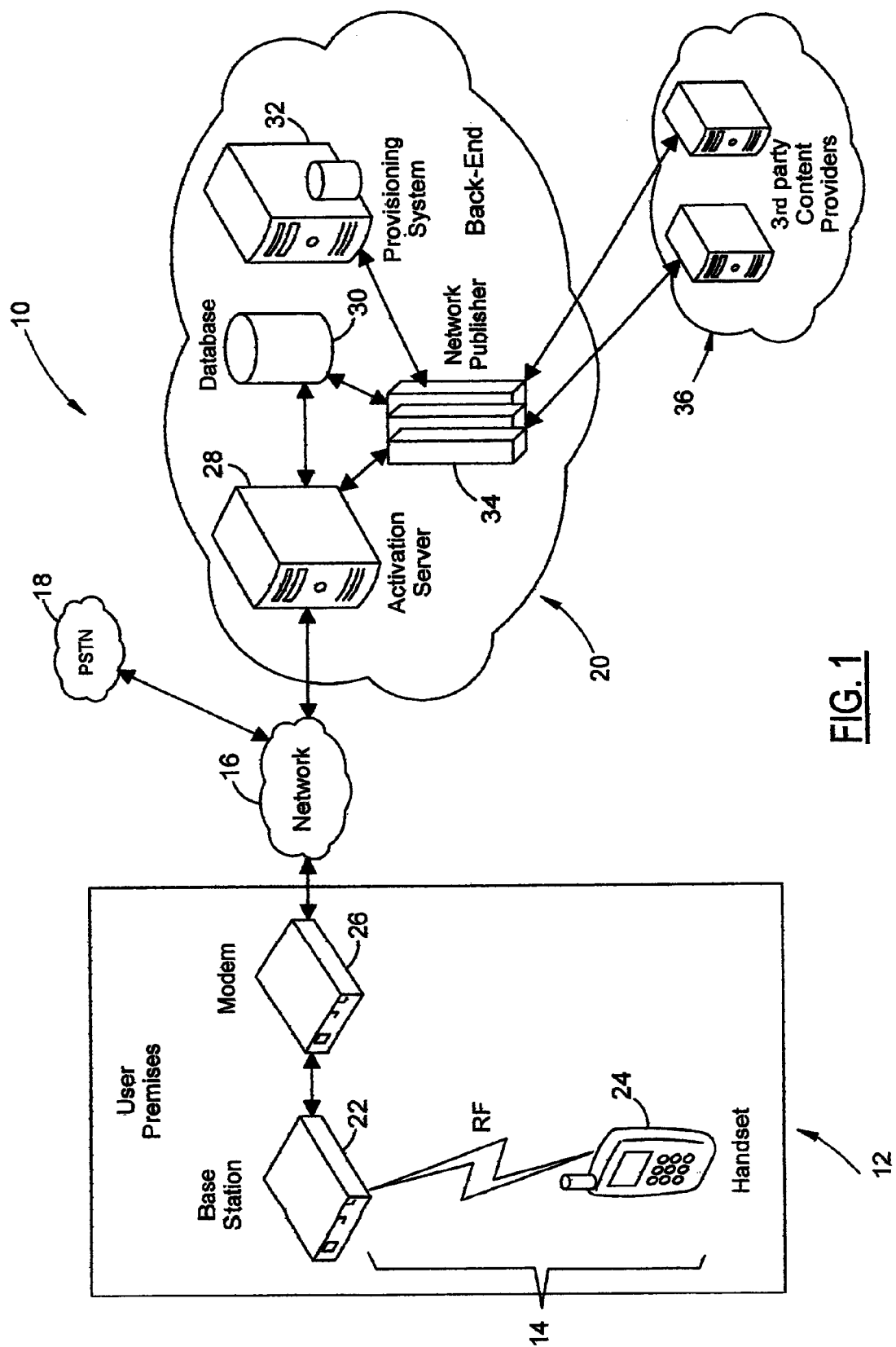
FIG. 1 illustrates a telecommunication network for use with a method and a system for installing digital telephony services at a user premises using a Digital Enhanced Cordless Telecommunication ("DECT") system in accordance with an embodiment of the present invention.

Referring now to FIG. 1, a telecommunication network 10 for use with a method and a system for installing digital telephony services at a user premises 12 using a Digital Enhanced Cordless Telecommunication ("DECT") system 14 in accordance with an embodiment of the present invention is shown. The telecommunication network 10 includes a communication network 16 of a telecommunication service provider. The network 16 utilizes coaxial cable, fiber optic cable, or a hybrid fiber coaxial cable (HFC). The network 16 may be a wireless network or include a wireless component. The network 16 is connected to the user premises 12, the public switched telephone network ("PSTN") 18, and a back-end network 20. The back-end network 20 is an Internet Protocol ("IP") network. The DECT system 14 includes a base station 22 and a cordless handset 24 at the user premises 12. A modem 26 such as a voice modem associated with the DECT system 14 is also at the user premises 12. At the user premises 12, the modem 26 is connected to the network 16 and the base station 18 is connected to the modem 26.

Upon the service provider providing digital telephony services to the user premises 12, a user at the user premises 12 is able to use the cordless handset 24 to make and receive calls over the network 16 via the base station 22 and the modem 26. The network 16 is connected to the PSTN 18 to enable the calls to be made and received with various other users. The cordless telephone 24 can be moved around and away from the base station 22 within a given area and receive and send data to the base station 22 representative of the incoming and outgoing calls.

In general, the DECT system 14 at the user premises 12 and the back-end network 20 communicate with one another over the modem 26 and the network 16 to enable the installation of digital telephony services at the user premises 12. The installation process starts with the DECT system 14 communicating a request for the installation of digital telephony services at the user premises 12 over the network 16 to the back-end network 20. The request includes information regarding the modem 26 such as its MAC address. In return, the back-end network 20 communicates over the network 16 with the DECT system 14 to inquire the user about which telephony services are desired. The back-end network 20 further communicates with the DECT system 14 over the network 16 to obtain the user's acceptance to the service provider's terms and conditions for providing the desired telephony services to the user. After the DECT system 14 communicates to the back-end network 20 which telephony services are desired by the user along with the user's acceptance to the terms and conditions, the back-end network 20 uses the information regarding the modem 26 and other information regarding the user premises 12 to activate the desired telephony services.

As described, the DECT system 14 at the user premises 12 includes the base station 22 and the cordless handset 24. The base station 22 is connected to the modem 26. To this end, the base station 22 includes an RJ11 interface and an RJ45 interface. The RJ11 interface connects to the RJ11 port of the modem 26 and the RJ45 interface connects to the RJ45 port of the modem 26 to connect the base station 22 to the modem 26. Of course, the two RJ interfaces and the two RJ ports may be integrated such that there is only one RJ interface and one RJ port. The base station 22 includes a power inlet and is capable of operating on both power and battery modes. The base station 22 is equipped with a handset locator for locating the cordless handset 24. The base station 22 includes built-in memory such as RAM to support the regular telephony features and IP network based features. In particular, a client application is stored in the memory of the base station 22. As described in greater detail below, the client application of the base station 22 acts as an interface between the user and the back-end network 20 enabling back and forth communication between the user and the back-end network 20 during the process for installing the telephony services at the user premises 12.

The cordless handset 24 includes a display unit and keys for dialing, selecting, and navigating operations. Such operations are used to support cordless telephony features. The cordless handset 24 further includes a battery and memory such as RAM. A multimedia application is stored in the memory of the cordless handset 24. As described in greater detail below, the multimedia application of the cordless handset 24 supports the display of contents (such as menus, messages, etc.) received from the back-end network 20 and supports the flow selection of the user during the process for installing the telephony services at the user premises 12.

The back-end network 20 includes an activation server 28, a database 30, a provisioning system 32, and a network publisher server 34. The activation server 28 is operable to interact with the multimedia application in the cordless handset 24 to enable back and forth communication between the user via the cordless handset 24 and the back-end network 20 via the application server 28. The provisioning system 32 performs the necessary service activation steps at the back-end network 20 for providing the desired telephony services to the user premises 12. The network publisher server 34 publishes the information regarding the modem 26 to the provisioning system 32. The network publisher server 34 also acts as an interface to communicate with third party content providers 36.

Figure 2:
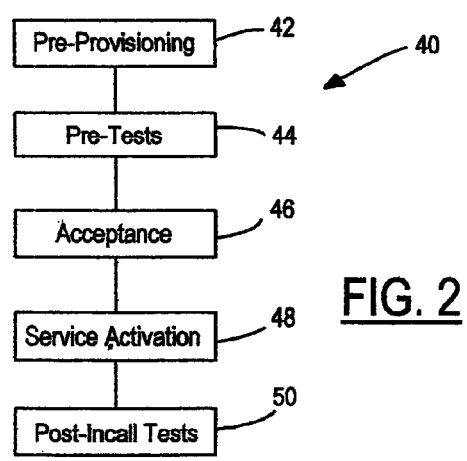
FIG. 2 illustrates a flow chart describing operation of a method and a system for installing digital telephony services at a user premises using a DECT system in accordance with an embodiment of the present invention.

Referring now to FIG. 2, with continued reference to FIG. 1, a flow chart 40 describing operation of a method and a system for installing digital telephony services at the user premises 12 using the DECT system 14 in accordance with an embodiment of the present invention is shown. The operation of flow chart 40 provides a self-install model for the automated installation of digital telephony services using a DECT based cordless telephone system to provide residential and business voice services. The operation of flow chart 40 includes the following phases: a pre-provisioning phase which is shown in block 42; a first phase of pre-tests to validate the network 16 signal strength at the user premises 12 which is shown in block 44; a second phase of obtaining the user's acceptance to the terms and conditions of the service provider for providing the desired telephony services to the user which is shown in block 46; a third phase of service activation which is shown in block 48; and a fourth phase of post-incall tests which is shown in block 50. The phases 42, 44, 46, 48, and 50 generally occur in the shown sequential order.

The pre-provisioning phase shown in block 42 includes the user at user premises 12 contacting the service provider and requesting telephony services from the service provider. This initial contact of the user with the service provider may be done by way of a phone, a portal, a retailer, etc. In turn, the service provider physically ships the modem 26 to the user at the user premises 12. It is assumed that the user has the DECT system 14. If not, then the service provider also physically ships the DECT system 14 to the user at the user premises 12. Prior to shipping the modem 26 to the user, the service provider obtains from the user basic information regarding the user's name, address, etc., along with a preliminary indication as to which telephony services the user wants. Upon receiving and connecting the modem 26 to the network 16 at the user premises 12 along with connecting the base station 22 to the modem 26, the user has the required equipment properly set up. However, the user still lacks the telephony services as such services have not yet been activated for the user premises 12. As described herein, the user uses the cordless handset 24 to have basic telephony service activated and can use the cordless handset 24 to have other advanced telephony services activated.

The first phase shown in block 44 includes validating the network 16 signal quality after the DECT system 14 and the modem 26 have been turned on with the base station 22 connected to the modem 26 and the modem 26 connected to the network 16 at the user premises 12. That is, the quality of the connection between the modem 26 and the network 16 is validated. The signal quality can be verified by validating the signal-to-noise ratio of the signal stream. Alternatively, downstream and upstream power can be used to validate the signal quality. If the signal quality is good, then the cordless handset 24 tries to establish a connection over the network 16 with the activation server 28 of the back-end network 20 via the modem 26. The base station 22 is configured with the URL of the activation server 28 so as to setup the connection.

After the connection between the cordless handset 24 and the activation server 28 is established, the client application of the base station 22 fetches information such as the MAC address of the modem 26 from the modem 26. The activation status of the cordless handset 24 is also verified. If the cordless handset 24 is activated, then a home screen is displayed on the display unit of the cordless handset 24. If the cordless handset 24 is not activated, then a process of activating the cordless handset 24 is initiated.

The second phase shown in block 46 includes the display unit of the cordless handset 24 displaying the service provider's terms and conditions for providing the desired telephony services to the user. To this end, the activation server 28 of the back-end network 20 sends to cordless handset 24 over the network 16 menus which are indicative of telephony services made available by the service provider to the user premises 12. The multimedia application of the cordless handset 24 enables the menus to be displayed on the display unit of the cordless handset 24 for the user to see. The multimedia application further enables the user to make selections from the menus using the keys of the cordless handset 24. In turn, the user's selections of the desired telephony services are sent from the cordless handset 24 over the network 16 to the application server 28. The activation server 28 also sends over the network 16 to the cordless handset 24 menus indicative of the service provider's terms and conditions for providing the desired telephony services to the user. Again, the multimedia application enables these menus to be displayed on the cordless handset 24 for the user to accept the terms and conditions by using the keys of the cordless handset 24. In turn, the user's acceptance to the terms and conditions are sent from the cordless handset 24 over the network 16 to the application server 28.

As such, the user can provide acceptance to the terms and conditions in different ways. One way, as described above, includes information such as text for the terms and conditions being sent in the form of HTTP packets from the application server 28 over the network 16 to the cordless handset 24 based on the user's request for desired telephony services. The multimedia application retrieves and translates the information in the packets for display on the cordless telephone 24.

The user navigates and provides concurrence to the terms and conditions by selecting the appropriate keys of the cordless handset 24. Selection of a key triggers a response message and traverses in the form of HTTP packets over the network 16 to the application server 28. Another way that the user can accept the terms and conditions includes the user calling up an IVR system of the back-end network 20 and providing acceptance by selecting the appropriate keys.

The digital telephony services to be provided by the service provider to the user include the assignment of a telephone number to the user premises 12 along with the basic ability of enabling the user to make phone calls at the user premises 12 to other phones over the network 16 and to receive at the user premises 12 phone calls from the network 16 which are addressed to the assigned telephone number. Other digital telephony services made available by the service provider to the user include, for example, enhanced 911 ("E911") services. Such optional telephony services, which are also displayed by way of menus from the application server 28 on cordless handset 24, require a mandatory response (either acceptance or rejection) from the user.

The third phase shown in block 48 includes completing the activation process to enable the desired telephony services to be provided by the service provider to the user premises 12. To this end, the client application in the base station 22 sends the information regarding the modem (such as the MAC address) over the network 16 to the activation server 28 of the back-end network 20. In turn, the activation server 28 communicates with the database 30 of the back-end network 20 to request a telephone number to be assigned to the user premises 12. The database 30 stores available telephone numbers which can be assigned to the user premises 12. In response to the request from the activation server 28, the database 30 provides to the activation server 28 an available telephone number to be assigned to the user premises 12. The activation server 28 then communicates the assigned telephone number over the network 16 for display on the cordless handset 24 such that the user is notified of the assigned telephone number. The activation server 28 then sends a service activation request including the assigned telephone number, the modem information, and information regarding the telephony services desired by the user to the network publisher 34 of the back-end network 20. In turn, the network publisher 34 forwards the service activation request to the provisioning system 32 of the back-end network 20. In an alternate step, the activation server 28 communicates the service activation request to the provisioning system 32 by automatically dialing an IVR system of the provisioning system 32. In either event, the provisioning system 32 performs the necessary service activation steps for providing the desired telephony services to the user premises 12 based on the service activation request.

The fourth phase shown in block 50 includes a post installation phase in which test calls are performed to ensure that incoming and outgoing calls to and from the user premises 12 are successful. Initially, the application server 28 sends a request over the network 16 to the cordless handset 24 for the user to make an outgoing test call using the cordless handset 24. Next, the application server 28 makes a call over the network 16 to the cordless handset 24. This call represents an incoming test call to the cordless handset 24. In the case of failure of either the outgoing test call or the incoming test call, the application server 26 sends a request over the network 16 to the cordless handset 24 for the user to contact a technical support team of the back-end network 20 for issue resolution.

Upon successful completion of the installation of the desired telephony services to the user premises 12, the application server 28 sends a notification regarding same over the network 16 to the cordless handset 24 to notify the user of the successful installation. Thus, the user premises 12 has gone through an end-to-end automated process for being installed with telephony services via the cordless handset 24 of the DECT system 14. If issues are observed during the course of the installation, then the application server 28 guides the user through messages displayed on the cordless handset 24 to take rectification steps. Additionally, troubleshooting steps can be made available to the user by an installation manual.

Figure 3:
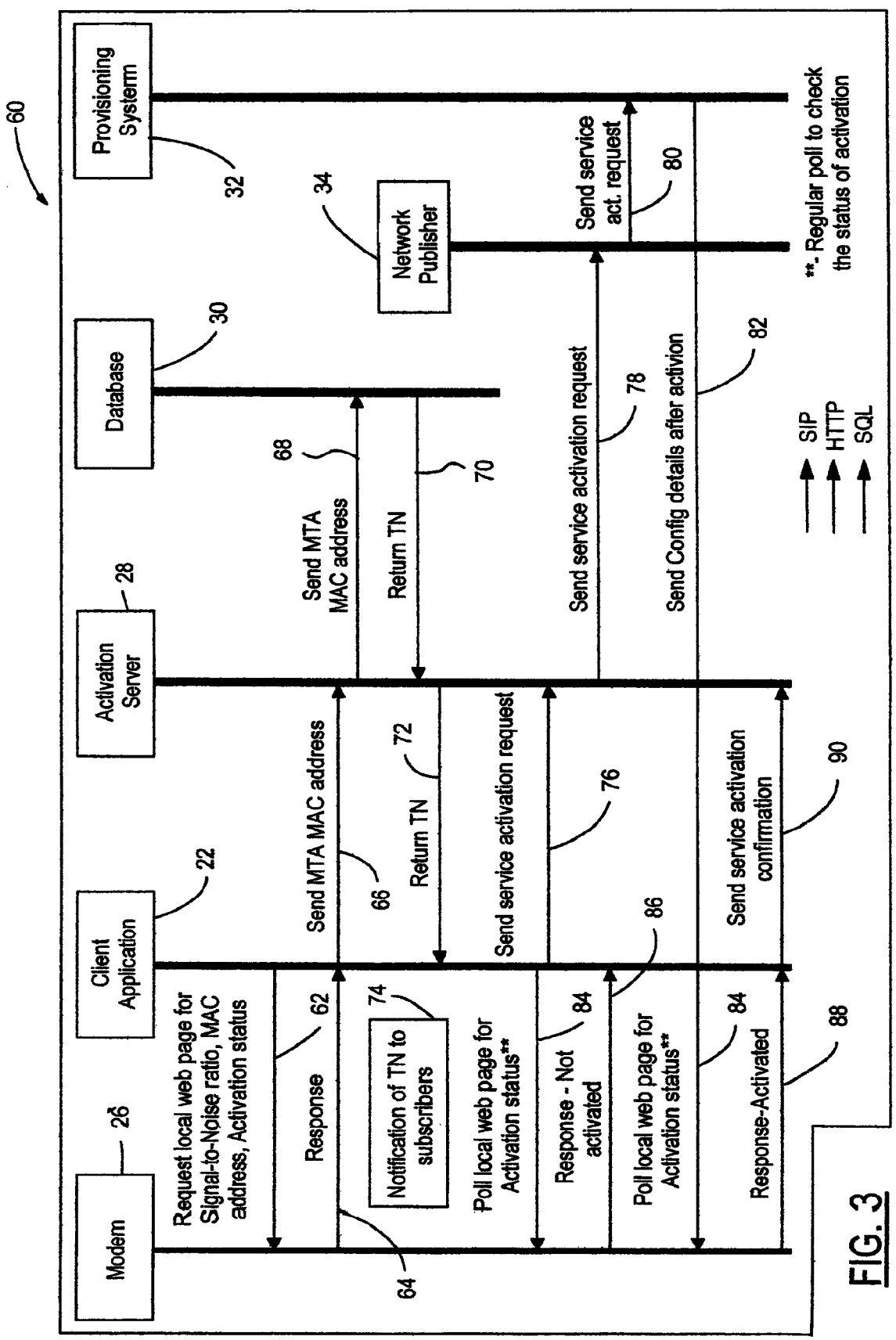
FIG. 3 illustrates the signaling flow of the activation process of a method and a system for installing digital telephony services at a user premises using a DECT system in accordance with an embodiment of the present invention.

Referring now to FIG. 3, with continued reference to FIGS. 1 and 2, the signaling flow 60 of the activation process of a method and a system for installing digital telephony services at the user premises 12 using the DECT system 14 in accordance with an embodiment of the present invention is shown. The signaling flow 60 of the activation process generally illustrates in greater detail the operation between the DECT system 14 and the back-end network 20 as described above with reference to FIG. 3.

Initially, when the DECT system 14 and the modem 26 are turned on with the base station 22 connected to the modem 26 and the modem 26 connected to the network 16, the client application in the base station 22 and the multimedia application in the cordless handset 26 are initiated. The client application of the base station 22 sends a request 62 to the modem 26 requesting the signal-to-noise ratio of the connection between the modem 26 and the network 16 and requesting the MAC address of the modem 26. The signal-to-noise ratio should be at least a threshold value identified for performing installation of telephony services. The modem 26 provides a response 64 of the requested information to the client application of the base station 22. The client application of the base station 22 then sends a message 66 containing the information received from the modem 26 to the application server 28 of the back-end network 20. The application server 28 performs a query 68 to the database 30 of the back-end network 20 to fetch a telephone number ("TN") to be assigned to the user premises 12. The database 30 sends a response 70 containing the assigned telephone number to the application server 28. The application server 28 sends a message 72 containing the assigned telephone number over the network 16 to the client application in the base station 22. The assigned telephone number is sent to the cordless handset 24 for display thereon as indicated in block 74.

The client application in the base station 22 then sends a service activation request 76 over the network 16 to the application server 28. The service activation request 76 is indicative of the assigned telephone number, the information regarding the modem 26, and information regarding which telephony services are desired by the user at the user premises 12. The activation server 28 forwards the service activation request 78 to the network publisher 34 of the back-end network 20. The network publisher 34 forwards the service activation request 80 to the provisioning system 32 of the back-end network 20. Based on the service activation request 80, the provisioning system 32 performs the necessary service activation steps for providing the desired telephony services to the user premises 12. After this back-end activation process, the provisioning system 32 sends a confirmation message 82 to the activation server 28 which is then sent over the network 16 to the modem 26 for display on the cordless handset 24.

During the installation process, the client application in the base station 22 periodically polls 84 the modem 26 to fetch the activation status of the modem 26. The modem 26 either responds to the client application in the base station 22 with a not activated message 86 if the modem 26 is not activated or with an activated message 88 if the modem 26 is activated. Upon receiving the activated message 88 from the modem 26, the client application in the base station 22 sends a service activation confirmation 90 to the activation server 28. The modem 26 is not activated until the telephony services have been successfully activated at the user premises 12. In this way, this periodic signaling flow between the client application in the base station 22 and the back-end network 20 are in sync with respect to the service activation of the telephony services at the user premises 12.

Figure 4:
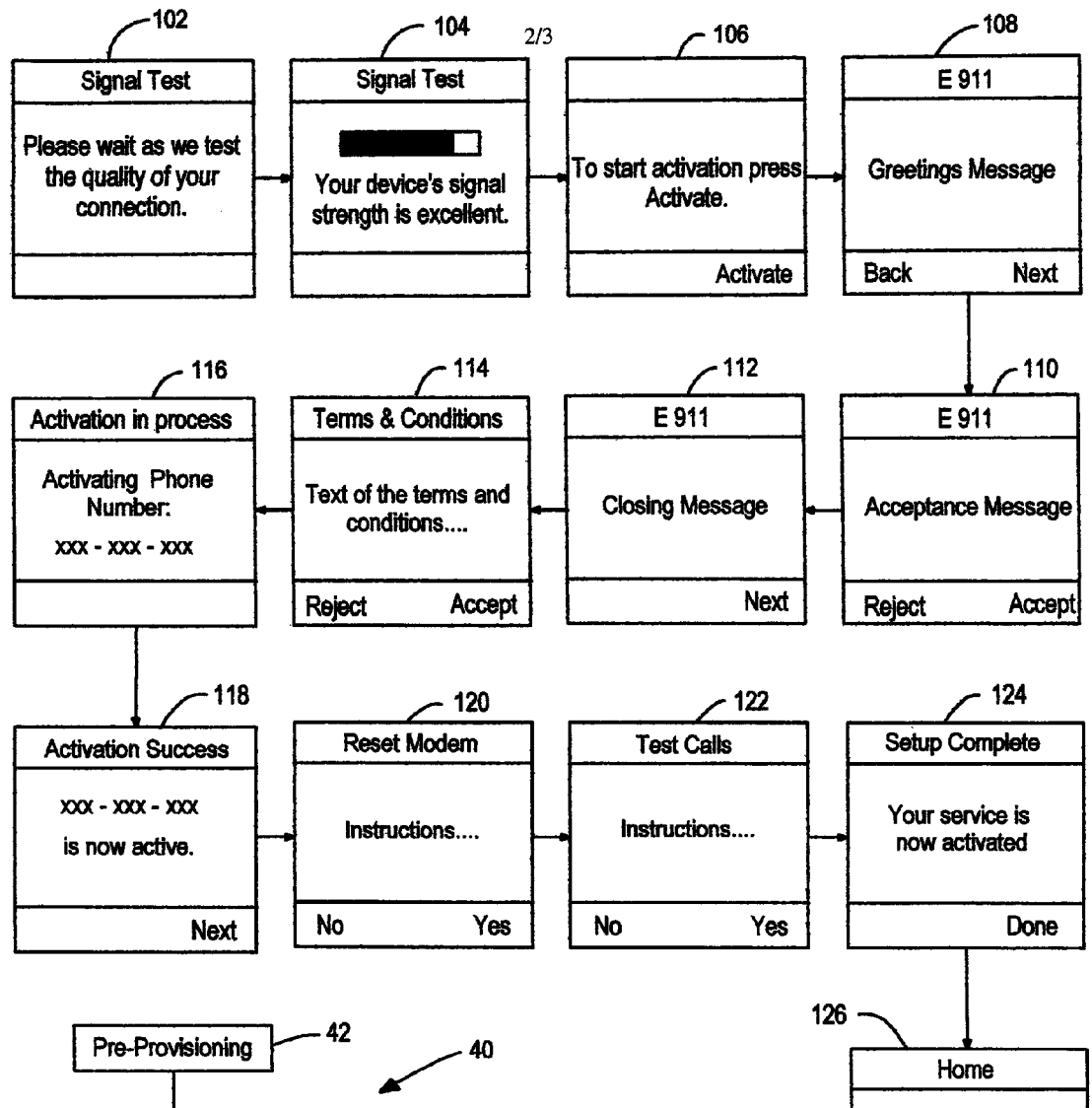
FIG. 4 illustrates a sample flow of the activation process of a method and a system for installing digital telephony services at a user premises using a DECT system in accordance with an embodiment of the present invention from the perspective of a user at the user premises.

Referring now to FIG. 4, with continued reference to FIGS. 1, 2, and 3, a sample flow 100 of the activation process of a method and a system for installing digital telephony services at the user premises 12 using the DECT system 14 in accordance with an embodiment of the present invention from the perspective of a user at the user premises 12 is shown. The sample flow 100 illustrates the messages displayed on the display unit of the cordless handset 24 during the installation process for activating the telephony services at the user premises 12. As described, these messages are sent from the activation server 28 of the back-end network 20 over the network 16 to the cordless handset 24 during the installation process. Likewise, as described, the user's response to the messages are sent from the cordless handset 24 over the network 16 to the activation server 28.

Initially, message 102 from the activation server 28 is displayed on the cordless handset 24 to indicate to the user that the signal quality test of the connection between the modem 26 and the network 16 is being conducted. Message 104 from the activation server 28 is then displayed on the cordless handset 24 to indicate to the user the result of the signal quality test. Message 106 from activation server 28 is then displayed on the cordless handset 24 to request the user's confirmation to start the activation process for installing digital telephony services at the user premises 12. The user confirms that the activation process is to start by pressing the soft-key "Activate" which is associated with a corresponding portion of the message 106 displayed on the cordless handset 24. The cordless handset 24 sends the user's confirmation over the network 16 to the activation server 28.

Message 108 from the activation server 28 is then displayed on the cordless handset 24 to introduce the user to other telephony services such as E911 which are available to be installed at the user premises 12. Message 110 from the activation server 28 is then displayed on the cordless handset 24 to request the user's acceptance of the other telephony services. The user either accepts or declines the other telephony services by pressing the soft-key "Accept" or the soft-key "Reject" which are associated with corresponding portions of the message 110 displayed on the cordless handset 24. The cordless handset 24 sends the user's acceptance or rejection of the other telephony services over the network 16 to the activation server 28. In response, closing message 112 from the activation server 28 is then displayed on the cordless handset 24 to indicate to the user that the activation server 28 has received the user's acceptance or rejection of the other telephony services.

Message 114 from the activation server 28 is then displayed on the cordless handset 24 to indicate to the user the service provider's terms and conditions for providing the telephony services desired by the user at the user premises 12. The user either accepts or declines these terms and conditions by pressing the soft-key "Accept" or the soft-key "Reject" which are associated with corresponding portions of the message 114 displayed on the cordless handset 24. If the user rejects the terms and conditions, then the installation process is terminated until this issue can be resolved.

If the user accepts the terms and conditions, then message 116 from the activation server 28 is displayed on the cordless handset 24 to indicate to the user the telephone number assigned to the user premises 12 and to indicate that the activation process for installing the desired telephony services at the user premises 12 is started and is in progress. After the provisioning system 32 of the back-end network 20 performs the provisioning steps for activating the desired telephony services at the user premises 12, message 118 from the activation server 28 is displayed on the cordless handset 24 to indicate to the user that the assigned telephone number for the user premises 12 is now active. The user indicates acknowledgment to the activation server by pressing the soft-key "Next" which is associated with a corresponding portion of the message 118.

Message 120 from the activation server 28 is then displayed on the cordless handset 24 to indicate to the user the instructions for resetting the modem 26. The user indicates to the activation server 28 that the user has reset the modem 26 by pressing the soft-key "Yes" which is associated with a corresponding portion of the message 120. Message 122 from the activation server 28 is then displayed on the cordless handset 24 to indicate to the user the instructions for making and receiving the test calls. After the outgoing and incoming test calls from and to the cordless handset 24 via the network 16 are successful, message 124 from the activation server 28 is displayed on the cordless handset 24 to indicate to the user that the desired telephony services have been installed and activated at the user premises 12. The user indicates acknowledgment to the activation server 28 by pressing the soft-key "Done" which is associated with a corresponding portion of the message 124. Message 126 is then displayed on the cordless handset 24 to indicate to the user that the cordless handset 24 is activated.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method comprising:
   receiving, by an application server from a handset, a request for telephony service to be activated at a user premises;
   measuring a signal quality of a connection between the application server and a modem over a communication network;
   determining that the signal quality of the connection between the application server and the modem meets a predetermined threshold;
   in response to the determining, sending, by the application server to the handset, a message comprising service activation terms and conditions to be accepted for the telephony service to be activated;
   receiving, by the application server from the handset, a response accepting the service activation terms and conditions for the telephony service to be activated;
   receiving, by the application server, an address of the modem;
   obtaining, by the application server from a database, a telephone number to be assigned to the user premises based on the address of the modem;
   sending, by the application server to a provisioning system, a service activation request for the provisioning system to activate the telephony service, wherein the service activation request comprises the telephone number and the address of the modem; and receiving, by the application server from the provisioning system, a confirmation of an activation process to activate the telephony service based on the service activation request.

2. The method of claim 1, further comprising:
sending, by the application server to the handset, a message indicative of the telephony service being activated.

3. The method of claim 1, further comprising:
sending, by the application server to the handset, a message requesting a user to use the handset to make an outgoing call and comprising instructions for making the outgoing call;
receiving, by the application server from the handset, a successful outgoing call; and
in response to the receiving the successful outgoing call, sending, by the application server to the handset, a message indicative of the telephony service being activated.

4. The method of claim 1, further comprising:
calling, by the application server, the handset with a test call; and
sending, by the application server to the handset, a message indicative of the telephony service being activated upon the test call being received at the handset.

5. The method of claim 1 wherein:
the application server, the database, and the provisioning system are part of an Internet Protocol ("IP") network connected to the communication network.

6. The method of claim 1 wherein:
receiving, by the application server from the handset, the response accepting the service activation terms and conditions for the telephony service to be activated comprises manipulating a soft-key of the handset to generate the response.

7. A method comprising:
receiving, by a computing device from a handset, a request of a user for telephony service to be activated at a user premises;
measuring a signal quality of a connection between the computing device and a modem over a communication network;
determining that the signal quality of the connection between the computing device and the modem meets a predetermined threshold;
in response to the determining, sending, to the handset, a message comprising service activation terms and conditions for the user to accept for the telephony service to be activated;
receiving, from the handset, a response of the user accepting the service activation terms and conditions for the telephony service to be activated;
receiving, from a base station via the communication network, an address of the modem;
obtaining a telephone number to be assigned to the user premises based on the address of the modem; and
sending, to a provisioning system, a service activation request comprising the telephone number and the address of the modem for the provisioning system to activate the telephony service at the user premises.

8. The method of claim 7, wherein:
the address of the modem comprises a Media Access Control ("MAC") address.

9. A method comprising:
sending, from a handset through a communication network to an application server, a request for telephony service to be activated at a user premises;
displaying a message indicating a signal quality of a connection over the communication network between the application server and the handset, wherein the signal quality meets a predetermined threshold;
after the displaying, receiving, from the application server, a message comprising service activation terms and conditions to be accepted for the telephony service to be activated;
displaying the service activation terms and conditions to be accepted for the telephony service to be activated;
sending, to the application server, a response accepting the service activation terms and conditions for the telephony service to be activated; and
receiving, from the application server, a telephone number to be assigned to the user premises based on an address of a modem.

10. The method of claim 9, further comprising:
receiving, from the application server, a message indicative of a plurality of telephone services available to a user at the user premises;
receiving, at the handset, a selection of a subset of the plurality of telephone services available to the user; and
sending, to the application server, a response indicating the subset of the plurality of telephone services to be activated at the user premises, wherein the service activation terms and conditions to be accepted for the telephony service to be activated correspond to the selected subset of the plurality of telephone services to be activated at the user premises.

11. The method of claim 9, further comprising:
displaying an option to accept and an option to reject the service activation terms and conditions to be accepted for the telephony service to be activated; and
registering an input entered by a user through an input unit of the handset, wherein the input is an acceptance or a rejection of the service activation terms and conditions to be accepted for the telephony service to be activated.

12. The method of claim 1, further comprising:
sending, by the application server to the handset, user instructions to reset the modem.

13. The method of claim 7, further comprising:
sending, by the computing device to the handset, user instructions to reset the modem.

14. The method of claim 9, further comprising:
receiving, from the application server, instructions to reset the modem; and
displaying the instructions to reset the modem.

15. The method of claim 11, wherein the displayed option to accept is associated with a first soft key of the handset and the displayed option to reject is associated with a second softkey of the handset.

* * * * *

UNITED STATES PATENT AND TRADEMARK OFFICE
CERTIFICATE OF CORRECTION

PATENT NO. : 9,014,692 B2  
APPLICATION NO. : 12/204897  
DATED : April 21, 2015  
INVENTOR(S) : Michael J. Cook Page 1 of 1

It is certified that error appears in the above-identified patent and that said Letters Patent is hereby corrected as shown below:

Specification

Column 4, Detailed Description of the Preferred Embodiment(s), Line 26:
Please delete "18" and insert --22--

Column 7, Detailed Description of the Preferred Embodiment(s), Line 63:
Delete "26" and insert --28--

Column 8, Detailed Description of the Preferred Embodiment(s), Line 24:
Delete "26" and insert --24--

Signed and Sealed this
Thirteenth Day of October, 2015

Michelle K. Lee
*Director of the United States Patent and Trademark Office*